(12) United States Patent
Griffin et al.

(10) Patent No.: US 10,077,484 B2
(45) Date of Patent: Sep. 18, 2018

(54) METHOD FOR PRODUCING A PLANETARY GEAR SHAFT HAVING INCREASED HARDNESS

(71) Applicant: Schaeffler Technologies AG & Co. KG, Herzogenaurach (DE)

(72) Inventors: Joseph T. Griffin, Matthews, NC (US); Earl Goldsberry, Cheraw, SC (US); Shawn Pierce, Fort Mill, SC (US); Al Thomas, Mint Hill, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 148 days.

(21) Appl. No.: 15/338,305

(22) Filed: Oct. 28, 2016

(65) Prior Publication Data

US 2018/0119243 A1 May 3, 2018

(51) Int. Cl.
| | |
|---|---|
| *C21D 1/06* | (2006.01) |
| *C23C 8/32* | (2006.01) |
| *C21D 9/28* | (2006.01) |
| *F16H 57/08* | (2006.01) |
| *F16H 57/00* | (2012.01) |
| *C21D 1/58* | (2006.01) |
| *C21D 1/613* | (2006.01) |
| *C21D 1/10* | (2006.01) |

(52) U.S. Cl.
CPC .............. *C21D 9/28* (2013.01); *C21D 1/06* (2013.01); *C21D 1/10* (2013.01); *C21D 1/58* (2013.01); *C21D 1/613* (2013.01); *C23C 8/32* (2013.01); *F16H 57/0031* (2013.01); *F16H 57/08* (2013.01); *C21D 2211/001* (2013.01)

(58) Field of Classification Search
CPC . C21D 9/28; C21D 1/58; C21D 1/613; C21D 1/06; C21D 1/10; C23C 8/32
See application file for complete search history.

(56) References Cited

U.S. PATENT DOCUMENTS

| | | | |
|---|---|---|---|
| 6,966,954 B2 | 11/2005 | Rhoads et al. | |
| 7,377,988 B2 | 5/2008 | Griffin et al. | |
| 8,313,592 B2 | 11/2012 | Cao et al. | |
| 2006/0207690 A1 | 9/2006 | Locke et al. | |

FOREIGN PATENT DOCUMENTS

| | | |
|---|---|---|
| CN | 101092722 B | 10/2010 |
| CN | 104233319 A | 12/2014 |

*Primary Examiner* — Jessee Roe
(74) *Attorney, Agent, or Firm* — Volpe and Koenig, P.C.

(57) ABSTRACT

A method of hardening a planetary gear shaft includes carbonitriding an outer peripheral surface of the planetary gear shaft and quenching the planetary gear shaft in oil at a temperature between approximately 120 and 150° C. The method also includes quenching the planetary gear shaft in a liquid at a temperature between approximately −70 and −120° C., and tempering the planetary gear shaft. After tempering, the outer peripheral surface of the planetary gear shaft includes a surface hardness of HV 832 or more and with the shaft material maintaining a hardness of at least HV 513 to a depth of at least 0.5 mm. High temperature tempering and induction hardening steps may be added to obtain soft ends of the shaft suitable for a staking operation.

19 Claims, 5 Drawing Sheets

METHOD FOR PRODUCING A PLANETARY GEAR SHAFT HAVING INCREASED HARDNESS

FIELD OF INVENTION

The present invention relates to a method for producing a planetary gear shaft, and, more particularly, to a method for producing a planetary gear shaft having increased hardness.

BACKGROUND

Planetary gears and gear sets are used in a variety of applications, including automotive systems. One example of a planetary gear is a pinion gear rotatably mounted on a shaft via a radial bearing. The shaft is attached on both sides to a carrier, which may also house additional pinion gears. In some applications, planetary gear shafts experience large surface contact pressures and high temperatures. An increasing need for smaller planetary gear sets and components or higher torque inputs in automotive applications has resulted in higher power density and higher contact pressures on the planetary gear shafts.

These planetary gear shafts may require sufficient hardness and strength to withstand surface contact pressures of 5000 MPa and above, while maintaining satisfactory rolling contact fatigue life, and dimensional stability at the elevated temperatures. These qualities are difficult to obtain using cost-effective materials and processes.

In particular, current heat treatment processes used to harden planetary gear shafts do not achieve a necessary hardness when applied to a smaller shaft. Alternative options for achieving localized surface hardness, such as shot peening, plating, coating, etc., do not provide sufficient hardness and/or hardness depth and may not provide quality rolling surfaces for radial bearings. Further, materials that inherently possess the requisite qualities are not economically viable. Thus, there is a need for a process for hardening cost-efficient materials (e.g., steel alloys) capable of producing planetary gear shafts with sufficient hardness qualities to withstand the increased surface contact pressures placed on shafts.

The present disclosure is directed to overcoming these and other problems of the prior art.

SUMMARY

In one aspect, the present disclosure is directed to a method of hardening a planetary gear shaft. The method includes carbonitriding an outer peripheral surface of the planetary gear shaft and quenching the planetary gear shaft in oil at a temperature between approximately 120 and 150° C. The method also includes cryogenically quenching the planetary gear shaft in a cryogenic fluid at a temperature between approximately −70 and −120° C., and tempering the planetary gear shaft. After tempering, the outer peripheral surface of the planetary gear shaft has a hardness of HV 832 or more, with the shaft material maintaining a hardness of at least HV 513 to a depth of at least 0.5 mm.

In another aspect, the present disclosure is directed to a method of manufacturing a planetary gear set. The method includes hardening a planetary gear shaft by: carbonitriding an outer peripheral surface of the planetary gear shaft, quenching the planetary gear shaft in oil at a temperature between approximately 120 and 150° C., cryogenically quenching the planetary gear shaft in a cryogenic fluid at a temperature between approximately −70 and −120° C., and tempering the planetary gear shaft. After tempering, the outer peripheral surface of the planetary gear shaft has a surface hardness of HV 832 or more, with the shaft material maintaining a hardness of at least HV 513 to a depth of at least 0.5 mm. The method further includes attaching a radial bearing assembly having rollers and a gear body having gear teeth to the planetary gear shaft, and attaching opposing ends of the planetary gear shaft to a carrier.

In some embodiments, the hardening includes high temperature tempering the planetary gear shaft and induction hardening the surface of the planetary gear shaft after quenching in the oil and before quenching in the cryogenic fluid. In a method including these additional steps, end surfaces of the planetary gear shaft have a hardness of between HV 170 and HV 350.

In still other embodiments, the hardening includes, in addition to tempering after quenching in the cryogenic fluid, tempering the planetary gear shaft after the quenching in the oil step and before the high temperature tempering step.

BRIEF DESCRIPTION OF THE DRAWING(S)

The foregoing Summary and the following detailed description will be better understood when read in conjunction with the appended drawings, which illustrate a preferred embodiment of the invention. In the drawings.

DETAILED DESCRIPTION OF THE PREFERRED EMBODIMENT(S)

Figure 1:
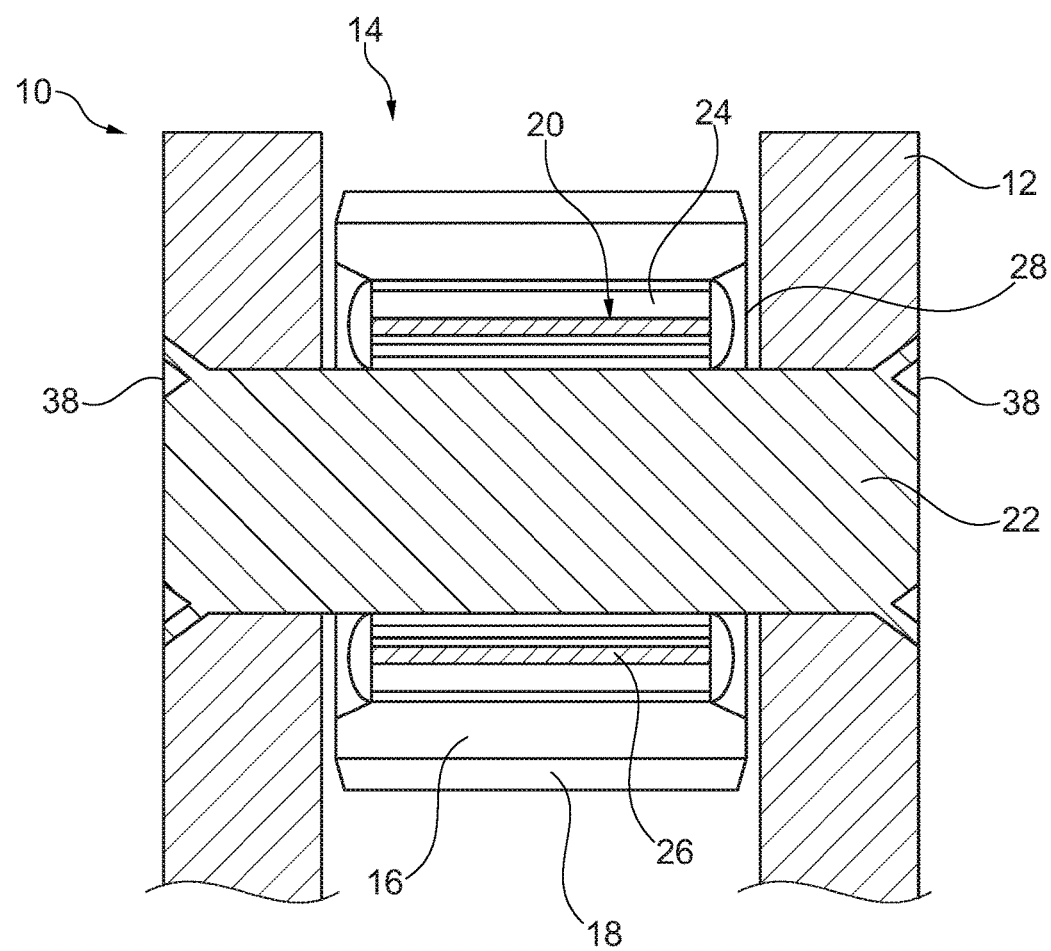
FIG. 1 is a cross-sectional view of a portion of a planetary gear set.

FIG. 1 illustrates a portion of an exemplary planetary gear set 10. The planetary gear set 10 includes a carrier 12 and a planetary gear 14. While only one planetary gear 14 is shown, it should be understood that the carrier 12 may include additional planetary gears 14. For example, the planetary gear 14 may be a pinion gear of a plurality of pinion gears arranged radially around an axial center of the carrier 12.

In an exemplary embodiment, the planetary gear 14 includes a gear body 16 having a plurality of gear teeth 18, a bearing assembly 20, and a shaft 22. The gear body 16 is generally cylindrical and includes a central bore for receiving the bearing assembly 20. The bearing assembly 20 is a radial bearing including rollers 24. The rollers 24 are preferably cylindrical, but may include other shapes. The rollers 24 may be held in place by a bearing cage 26.

The rollers 24 are configured to roll between opposing races. For example, a first race may be formed by an inner surface of the gear body 22, or by a separate component of bearing assembly 20. A second race is preferably formed by the shaft 22. In other words, the rollers 24 are in contact with and roll on an outer surface 28 of the shaft 22.

During operation, the planetary gear 14 engages other gear components (e.g., a sun gear and/or a ring gear), imparting an operative force on the planetary gear 14. The operative force includes a surface contact pressure imparted on the shaft 22. In some instances, this surface contact pressure may be 5000 MPa or above. Coupled with the high operation temperatures that may be present, the shaft 22 may be susceptible to deformation. Therefore, the shaft 22 must include characteristics capable of withstanding these conditions in order for the planetary gear 14 to remain operable for a desired part lifetime.

Figure 2:
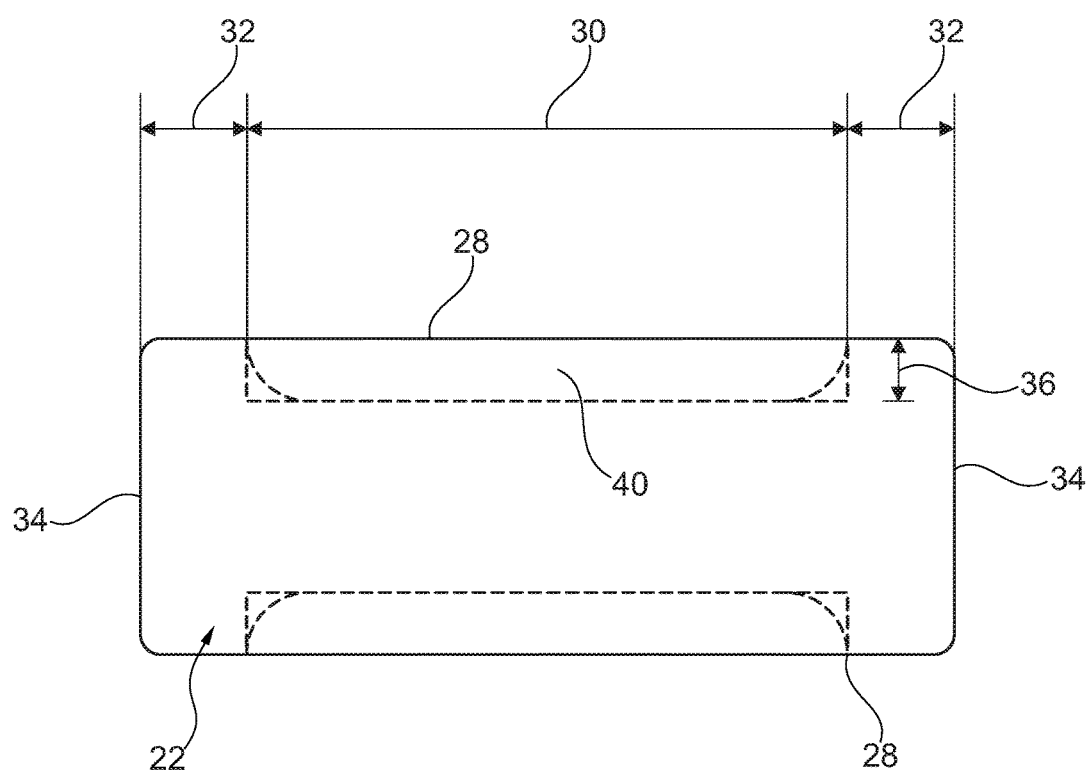
FIG. 2 depicts a shaft that may be used in conjunction with the planetary gear set of FIG. 1.

FIG. 2 further illustrates the shaft 22. The shaft 22 includes a middle section 30 and a pair of opposing end sections 32. The outer surface 28 of the shaft 22 extends through the middle section 30 and the end sections 32 between opposing end surfaces 34. The end surfaces 34 are circular surfaces extending generally perpendicular to the outer surface 28 and parallel to each other. In general, the middle section 30 corresponds to the portion of the outer surface 28 that contacts the rollers 24. In other words, the length of the middle section 30 is approximately equal to a length of the rollers 24. The end sections 32 are defined between the middle section 30 and a respective end surface 34.

At least the middle section 30 must include a sufficient hardness to provide a stable race surface for the rollers 24, capable of withstanding high surface contact pressures at high temperatures. In an exemplary embodiment, this sufficient hardness has been found to be at least HV 832. Moreover, the hardness must extend deep enough from the outer surface 28 into the body of the shaft 22 to provide the stable race surface. In particular, the hardness must include a sufficient depth 36 of hardened material. In at least some embodiments, the depth of hardened material in which hardness does not drop below HV 513 necessary has been found to be at least 0.5 mm. This area is indicated at a hardened portion 40. Although the hardened portion 40 is shown only near the surface portions of the shaft 22, it should be understood that the depth of the hardened portion may as large as the radius of the shaft 22, such that up to the entire body of the shaft 22 includes the hardened portion 40. The depth of the hardened portion 40 will depend on several factors, including the material of the shaft 22 and the parameters of the hardening process.

The manner in which the shaft 22 is attached to the carrier 12 will also affect the mechanical properties of the shaft 22. For example, in some embodiments, the shaft 22 is preferably attached to the carrier 12 using a staking process. As shown in FIG. 1, staking involves deforming a portion 38 of the end surfaces 34 of the shaft 22 in order to create an interference fit between the shaft 22 and the carrier 12. In order to be able to stake the ends of the shaft 22, however, the hardness of the end sections 32, and, in particular, the end surfaces 34, must be lower than the HV 832 needed for the outer surface 28 in the middle section 30. For example, the end surfaces 34 preferable have a hardness of between HV 170 and HV 350. It should be understood that other methods of attaching may be used to attach the shaft 22 to the carrier 12. These other methods (e.g., threaded attachment, adhesive, etc.) may not require the end sections 34 to be softer.

A hardening process is disclosed to produce the above-described mechanical properties in the shaft 22, which is made of an economically-viable material, such as a steel alloy. The hardening process will vary depending on the manner in which the shaft 22 is to be attached to the carrier 12. For example, if the shaft 22 is to be staked into the carrier 12, the hardening process will include additional steps in order to provide for the softer end sections 32.

Figure 3:
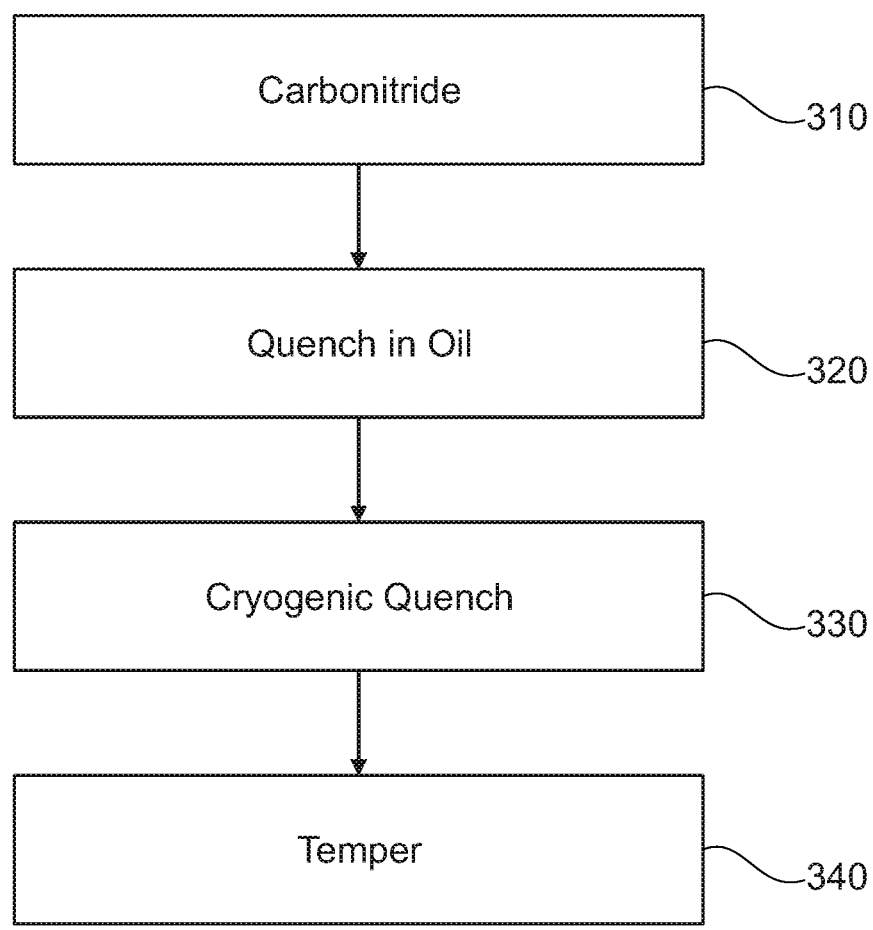
FIG. 3 is a flowchart of an exemplary hardening process for treating a shaft.

FIG. 3 illustrates an exemplary hardening process 300 for treating the shaft 22. The hardening process includes carbonitriding the shaft 22 (step 310). For example, the outer peripheral surface 28 of the shaft 22 is exposed to a gas mixture which causes carbon and/or nitrogen atoms to diffuse into the shaft 22.

Figure 3A:
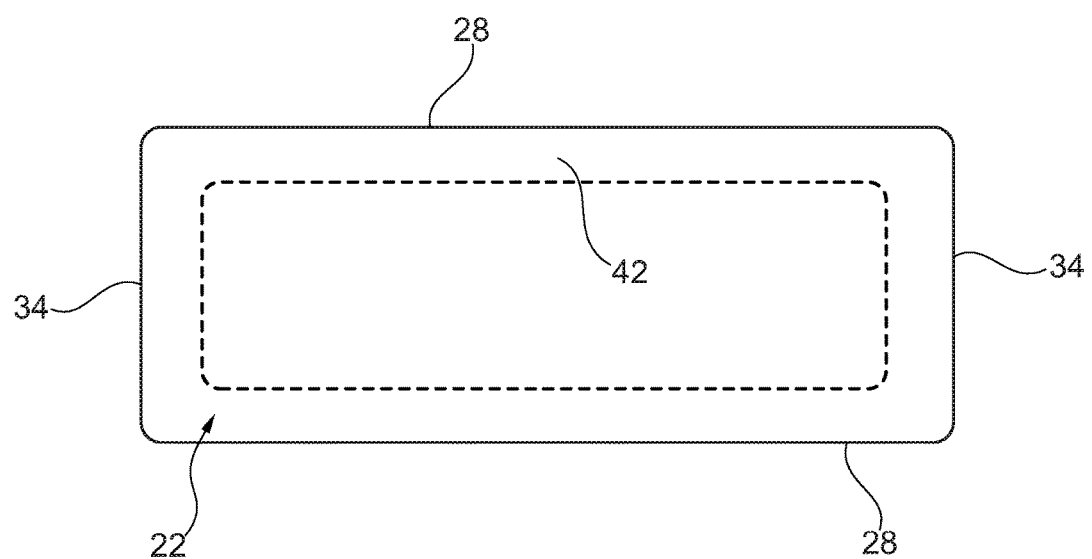
FIG. 3A depicts the shaft after a carbonitriding step of a heat treatment process.

FIG. 3A illustrates the shaft 22 after the carbonitriding step. In particular, an enriched portion 42 (extending from the outer peripheral surface 28 to a selected depth) is formed containing a high concentration of carbon and nitrogen atoms, which give properties that increase hardness after quenching in oil, and will allow further hardening.

After the carbonitriding, the shaft 22 is quenched in an oil bath (step 320). For example, the shaft 22 is quenched in oil at approximately 120-150° C. As a result of the oil quench, the enriched portion 42 includes a surface hardness of approximately HV 800-940. The depth of the increased surface hardness depends on the material used for the shaft 22. If the shaft 22 is a low carbon steel, for instance, the hardened portion 40 is generally limited to an area near the surfaces of the shaft 22, as shown in FIG. 2. If the shaft 22 is a high carbon steel, the hardened portion 40 will extend throughout the entire body of the shaft 22 (e.g., it will not drop significantly at any particular depth), such that the depth of the hardened portion 40 is equal to the radius of the shaft 22.

The oil quench transforms austenite into martensite, which causes the increased hardness in the hardened portion 40. However, retained austenite (e.g., austenite that did not transform into martensite) may still be relatively high after the oil quench. For example, retained austenite may be approximately between 5 and 25% of the material in the hardened portion 40 of the shaft 22. In embodiments that include high-carbon steel, where the shaft 22 may harden throughout after the oil quench, the retained austenite of between 5 and 25% may apply only to the area corresponding to the enriched portion 42.

In order to further harden the shaft 22, the shaft 22 is then cryogenically quenched (step 330). For example, the shaft 22 is submerged in a cryogenic fluid (e.g., liquid nitrogen) at a temperature between approximately −70 and −120° C. The cryogenic quench further transforms austenite (e.g., retained austenite after the oil quench) into martensite, which further hardens the shaft 22. For example, after the cryogenic quench, retained austenite in the hardened portion 40 is less than 5%. This may apply to the entire hardened portion 40 or only the area corresponding to the enriched portion 42, depending on the material used for the shaft 22.

The cryogenically-quenched shaft 22 is then tempered (step 340). The tempering treatment helps to reduce internal stresses in the shaft 22, improving ductility and reducing brittleness. For example, brittle tetragonal martensite is transformed into more ductile cubic martensite. In one embodiment, the tempering treating includes exposing the shaft 22 to a temperature of approximately 180-230° C. followed by air cooling at ambient temperature.

After the tempering step, at least the outer peripheral surface of the shaft 22 includes the hardened portion 40 having a hardness of at least HV 832 and a depth of hardened material in which hardness does not drop below HV 513, of at least 0.5 mm. As a result of the process 300, the end surfaces 34 may include a similar hardness to the outer peripheral surface 28. Therefore, planetary gear shafts hardened with process 300 may be attached to carrier 12 through a process other than staking or otherwise deforming shaft 22. In order to produce softer end sections 32, additional treatment steps may be performed, as described below.

Figure 4:
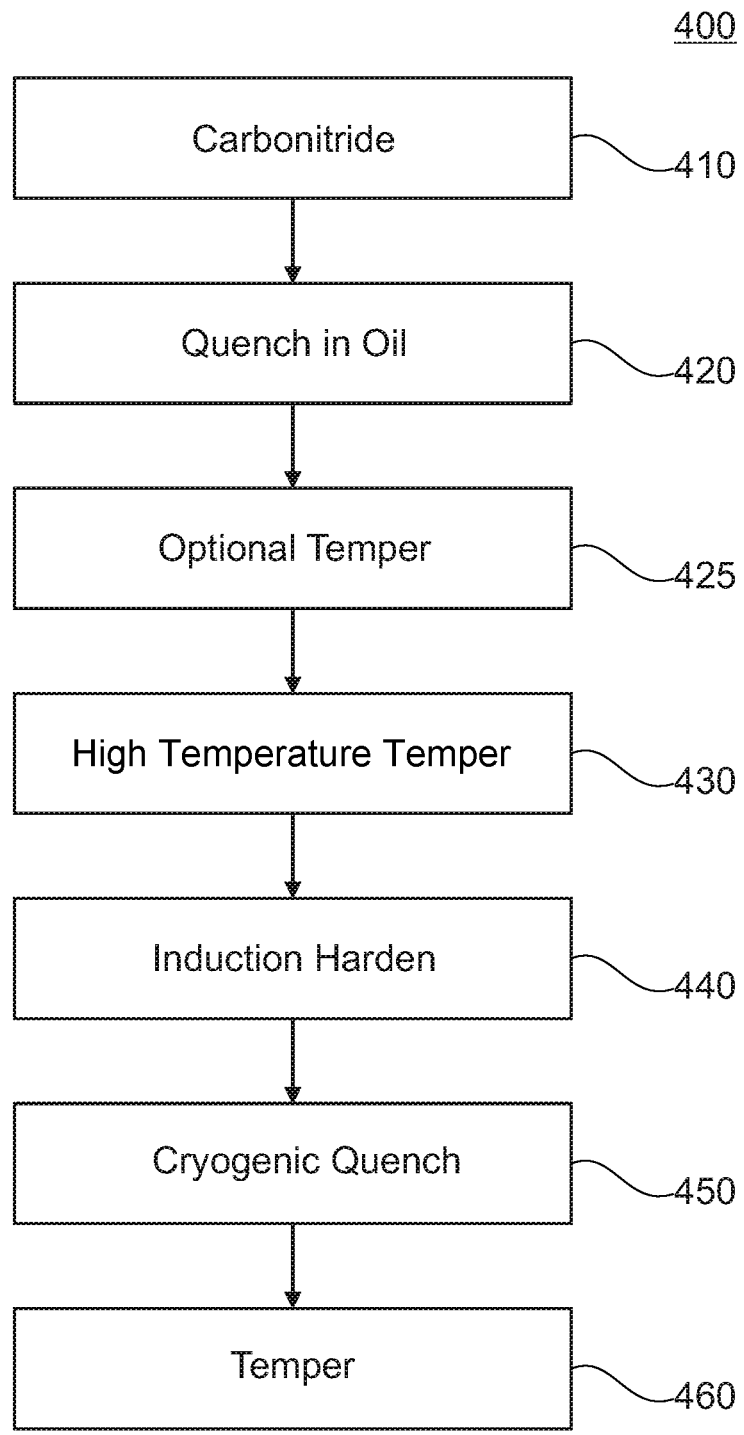
FIG. 4 is a flowchart of another exemplary hardening process for treating a shaft, including steps to produce softer ends for staking.

FIG. 4 illustrates another hardening process 400 for treating the shaft 22. The hardening process 400 includes steps that produce softer end sections 32, thereby allowing the shaft 22 to be staked into the carrier 12. The hardening process 400 includes carbonitriding (step 410) and quenching in oil (step 420), as described above in relation to process 300. At this point, an optional temper step (step 425) may be performed.

After quenching in the oil (or the optional temper), the shaft 22 is high temperature tempered (step 430) to obtain the required low hardness in the end sections 32. The high temperature tempering step may include heating the shaft 22 to approximately 650° C. or higher for 2-4 hours followed by slow cooling back to ambient temperature. The high temperature tempering step lowers the hardness of the shaft 22, such as to approximately HV 170-350. In this state, the microstructure of the shaft 22 is primed for re-hardening and the ends of the shaft 22 are sufficiently soft to allow a staking operation to be performed. The high temperature tempering step could alternatively be or be considered an annealing step.

Next, the shaft 22 is induction hardened (step 440). The induction hardening process is applied only to the middle section 30 of the shaft 22 to harden the raceway portions of the shaft 22 (i.e., not the end surfaces 34). This is achieved by induction heating the outer surface 28 followed by quenching. In an exemplary embodiment, the induction hardening step includes heating at a temperature of 800-1050° C. followed by quenching in oil.

After the quenching associated with the induction hardening step, the hardened portion 40 includes approximately 5-25% retained austenite and a hardness of approximately HV 700-900. The end surfaces, on the other hand, are not substantially affected by the induction hardening step, and maintain a soft, workable structure.

In order to further harden the outer surface 28, process 400 further includes cryogenically quenching the shaft 22 (step 450) and tempering (step 460). These steps may be the same as steps 330 and 340 described above in process 300. For example, the induction-hardened shaft 22 is submerged in a cryogenic fluid (e.g., liquid nitrogen) at a temperature between approximately −70 and −120° C. The cryogenic quench further transforms austenite (e.g., retained austenite after the oil quench) into martensite, which further hardens the shaft 22. After the cryogenic quench, retained austenite in the hardened portion 40 is less than 5%. The tempering step reduces internal stresses and improves ductility.

After the tempering step, the outer peripheral surface of the shaft 22 includes the hardened portion 40 having a hardness of at least HV 832 and an effective case hardening depth 36 of at least 0.5 mm at HV 513. As a result of the process 400, the end surfaces 34 remain soft and include a hardness of between HV 170 and HV 350. Therefore, planetary gear shafts hardened with process 400 may be attached to carrier 12 through a staking process in which the ends are deformed to fix the shaft 22 to the carrier 12.

The exemplary disclosed processes 300 and 400 present alternative methods for hardening a planetary gear shaft such that an outer peripheral surface of the planetary gear shaft includes a hardened portion having a surface hardness of HV 832 or more with the shaft material maintaining a hardness of at least HV 513 to a depth of at least 0.5 mm. The processes include several steps in common, including a cryogenic quench which ultimately produces high hardness characteristics. The high hardness produced by the cryogenic quench provides a strength not previously found in planetary gear shafts made by a cost-efficient material, such as a steel alloy. This strength allows such shafts to withstand greater surface contact pressures than conventional shafts (e.g., contact pressures in excess of 5000 MPa). In this way, a planetary gear set may be made to include smaller planetary gear shafts for fitting into small operational spaces. Moreover, the shafts may be used in other situations in which shaft deformation due to high contact pressures is a problem.

An associated method for manufacturing a planetary gear set is also disclosed. The method may include hardening a planetary gear shaft according to one of the processes 300 or 400 described above. A bearing assembly having rollers and a gear body having gear teeth are then attached to the planetary gear shaft. In addition, opposing ends of the planetary gear shaft are attached to a carrier. In some embodiments (i.e., when the planetary gear shaft is hardened via process 400), attaching the planetary gear shaft to the carrier includes a staking operation in which the ends of the planetary gear shaft are deformed. Further, in some embodiments, the process includes hardening a plurality of planetary gear shafts and attaching each planetary gear shaft to the carrier at separate locations.

Having thus described the presently preferred embodiments in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiments and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

PARTS LIST

10. Planetary Gear Set
12. Carrier
14. Planetary Gear
16. Gear Body
18. Gear Teeth
20. Bearing Assembly
22. Shaft
24. Radial Roller Bearing
26. Bearing Cage
28. Outer Surface
30. Middle Section
32. End Sections
34. End Surfaces
36. Case Depth
38. Portion
40. Hardened Portion
42. Enriched Portion

What is claimed is:

1. A method of hardening a planetary gear shaft, comprising:
    carbonitriding an outer peripheral surface of the planetary gear shaft;
    quenching the planetary gear shaft in oil at a temperature between approximately 120 and 150° C.;
    quenching the planetary gear shaft in a cryogenic fluid at a temperature between approximately −70 and −120° C.; and tempering the planetary gear shaft,
wherein, after tempering, the outer peripheral surface of the planetary gear shaft includes a hardened portion having a surface hardness of HV 832 or more and with the shaft material maintaining a hardness of at least HV 513 to a depth of at least 0.5 mm.

2. The method of claim 1, wherein, after quenching in the oil, the hardened portion includes between 5% and 25% retained austenite.

3. The method of claim 2, wherein, after quenching in the cryogenic fluid, the hardened portion includes less than 5% retained austenite.

4. The method of claim 1, wherein tempering includes exposing the planetary gear shaft to a temperature of approximately 180-230° C. followed by air cooling at ambient temperature.

5. The method of claim 1, further including:
high temperature tempering the planetary gear shaft; and
induction hardening the surface of the planetary gear shaft.

6. The method of claim 5, wherein high temperature tempering and induction hardening are performed after quenching in the oil and before quenching in the cryogenic fluid.

7. The method of claim 6, wherein, after the tempering, end surfaces of the planetary gear shaft have a hardness of between HV 170 and HV 350.

8. The method of claim 5, further including, in addition to tempering after quenching in the cryogenic fluid, tempering the planetary gear shaft after the quenching in the oil step and before the high temperature tempering step.

9. The method of claim 1, wherein the planetary gear shaft is a steel alloy.

10. The method of claim 1, wherein the cryogenic fluid is nitrogen.

11. A method of manufacturing a planetary gear set, comprising: hardening a planetary gear shaft by:
carbonitriding an outer peripheral surface of the planetary gear shaft;
quenching the planetary gear shaft in oil at a temperature between approximately 120 and 150° C.;
quenching the planetary gear shaft in a cryogenic fluid at a temperature between approximately −70 and −120° C.; and
tempering the planetary gear shaft,
wherein, after tempering, the outer peripheral surface of the planetary gear shaft including a surface hardness of HV 832 or more and with the shaft material maintaining a hardness of at least HV 513 to a depth of at least 0.5 mm;
attaching a bearing assembly having radial roller bearings and a gear body having gear teeth to the planetary gear shaft; and
attaching opposing ends of the planetary gear shaft to a carrier.

12. The method of claim 11, further including:
high temperature tempering the planetary gear shaft; and
induction hardening the surface of the planetary gear shaft.

13. The method of claim 12, wherein high temperature tempering and induction hardening are performed after quenching in the oil and before quenching in the cryogenic fluid.

14. The method of claim 13, wherein, after the tempering, end surfaces of the planetary gear shaft include a hardness of between HV 170 and HV 350.

15. The method of claim 14, wherein attaching the opposing ends of the planetary gear shaft to the carrier includes staking the opposing ends.

16. The method of claim 12, further including, in addition to tempering after quenching in the liquid, tempering the planetary gear shaft after the quenching in the oil step and before the high temperature tempering step.

17. The method of claim 11, wherein the planetary gear shaft includes a plurality of planetary gear shafts each attached to the carrier at separate locations.

18. The method of claim 11, wherein the planetary gear shaft is a steel alloy.

19. The method of claim 11, wherein the cryogenic fluid is nitrogen.

* * * * *